US008535152B2

(12) United States Patent
Holenweg et al.

(10) Patent No.: US 8,535,152 B2
(45) Date of Patent: Sep. 17, 2013

(54) INTEGRATED GAME FUNCTION IN A PERSONAL MOBILITY VEHICLE, SUCH AS A WHEELCHAIR

(75) Inventors: Matthias Holenweg, Buren an der Aare (CH); Kurt Stump, Batterkinden (CH); Stuart E. Marwell, Katonah, NY (US)

(73) Assignee: Curtis Instruments, Inc., Mt. Kisco, NY (US)

( * ) Notice: Subject to any disclaimer, the term of this patent is extended or adjusted under 35 U.S.C. 154(b) by 288 days.

(21) Appl. No.: 12/803,389

(22) Filed: Jun. 24, 2010

(65) Prior Publication Data

US 2010/0331081 A1 Dec. 30, 2010

Related U.S. Application Data

(60) Provisional application No. 61/269,620, filed on Jun. 26, 2009.

(51) Int. Cl.
*A63F 13/00* (2006.01)

(52) U.S. Cl.
USPC ........................................................ 463/30

(58) Field of Classification Search
USPC ........ 463/6, 30, 38, 40; 180/65; 340/539.11, 340/539.13, 573.1
See application file for complete search history.

(56) References Cited

U.S. PATENT DOCUMENTS

| | | | | |
|---|---|---|---|---|
| 5,245,558 | A | 9/1993 | Hachey | 364/708.1 |
| 6,374,276 | B2 | 4/2002 | Vong et al. | 708/112 |
| 6,739,653 | B1 * | 5/2004 | Hoekstra et al. | 297/148 |
| 6,774,795 | B2 * | 8/2004 | Eshelman et al. | 340/573.1 |
| 7,611,409 | B2 * | 11/2009 | Muir et al. | 463/29 |
| 8,099,332 | B2 * | 1/2012 | Lemay et al. | 705/26.1 |
| 2007/0056780 | A1 | 3/2007 | Jaenke et al. | 180/65.1 |
| 2009/0005165 | A1 * | 1/2009 | Arezina et al. | 463/37 |
| 2010/0048271 | A1 * | 2/2010 | Champagne et al. | 463/6 |
| 2010/0160016 | A1 * | 6/2010 | Shimabukuro et al. | 463/16 |
| 2011/0003632 | A1 * | 1/2011 | Ansari et al. | 463/25 |
| 2011/0028207 | A1 * | 2/2011 | Gagner et al. | 463/25 |
| 2011/0105226 | A1 * | 5/2011 | Perlman | 463/30 |
| 2011/0294575 | A1 * | 12/2011 | Morrow et al. | 463/30 |

FOREIGN PATENT DOCUMENTS

| | | | |
|---|---|---|---|
| EP | 1774944 | A2 * | 4/2007 |
| JP | 2004-37413 | | 2/2004 |

OTHER PUBLICATIONS

McLean et al. (IBM), ip.com, Computer-In-An-Armchair, Feb. 1, 1990, IBM Technical Disclosure Bulletin, vol. 32, No. 9B, pp. 4.*

* cited by examiner

*Primary Examiner* — Arthur O. Hall
*Assistant Examiner* — Shahid Kamal
(74) *Attorney, Agent, or Firm* — Harrington & Smith

(57) ABSTRACT

A personal mobility vehicle, such as a wheelchair system, includes a user interface that includes a user input and a display for displaying information to the user and a control unit that includes a data processor and a memory. The data processor is responsive to the user entering information into the personal mobility vehicle, where the information indicates a user selection of a game function integrated into the personal mobility vehicle, to enable the user play a game via the user interface. The operation of playing the game includes a preliminary step of switching at least a portion of the user interface from a normal mode of controlling some function, such as mobility, of the personal mobility vehicle to a game playing function.

20 Claims, 3 Drawing Sheets

INTEGRATED GAME FUNCTION IN A PERSONAL MOBILITY VEHICLE, SUCH AS A WHEELCHAIR

CLAIM OF PRIORITY FROM COPENDING PROVISIONAL PATENT APPLICATION

This patent application claims priority under 35 U.S.C. §119(e) from Provisional Patent Application No. 61/269,620, filed Jun. 26, 2009, the disclosure of which is incorporated by reference herein in its entirety.

TECHNICAL FIELD

The exemplary embodiments of this invention relate generally to personal mobility vehicles such as wheelchairs, and more specifically relate to control systems and user interfaces for such vehicles.

BACKGROUND

Self-powered personal mobility vehicles, such as wheelchairs having a self-contained power source to provide drive power to wheels and steering actuators, may include a data processor subsystem to control the various power and motive subsystems of the vehicle, as well as to implement a user interface function enabling an occupant of the vehicle to control the overall operation of the vehicle, such as to start, stop and steer the vehicle.

A wheelchair user may spend most of the day in the wheelchair, and may wish to occasionally pass the time by playing games. However, at present typically the user is constrained to using a separate portable third party game console, or to using a link, such as a Bluetooth™ link, to game software running on a personal computer (PC). This type of operation may be unsatisfactory for some users, as they cannot use their preferred input wheelchair control mechanism that forms a part of the wheelchair system (e.g., head array or joystick as two non-limiting examples).

Further, in at least the latter case the user cannot always initiate game play as desired. As one example the user may not be able to initiate game play while waiting for a doctor's appointment, where the user's PC is not available to be connected to via a wireless link, such as a Bluetooth™ link.

The exemplary embodiments of this invention are directed to improvements in these and other types of personal mobility vehicles.

SUMMARY

The foregoing and other problems are overcome, and other advantages are realized, in accordance with the presently preferred embodiments of this invention.

The exemplary embodiments of this invention provide a personal mobility vehicle, such as a wheelchair system, having a user interface that includes a user input, a display for displaying information to the user, and a control unit that includes a data processor and a memory. The data processor is responsive to the user entering information into the personal mobility vehicle, where the information indicates a user selection of a game function integrated into the personal mobility vehicle, to enable the user to play a game via the user interface. The operation of playing the game includes a preliminary step of switching at least a portion of the user interface from a normal mode of controlling some function, such as mobility, of the personal mobility vehicle to a game playing function.

Also disclosed are methods and computer programs, stored in one or more memories, for implementing the exemplary embodiments of the gaming function that is integrated into the personal mobility vehicle.

For example, a further aspect of the exemplary embodiments of this invention is a method that comprises receiving an input from a user, the input selecting a game function via a user interface of the personal mobility vehicle, the game function being integrated into the personal mobility vehicle; and the user playing a game via the user interface.

Further by example, another non-limiting aspect of the exemplary embodiments of this invention is a memory that tangibly stores a computer program for execution by a data processor to implement a user interface of a wheelchair system by operations that comprise enabling a user to select a game function via a user interface of the wheelchair system, the game function being integrated into the wheelchair system; and enabling the user to play a game via the user interface.

BRIEF DESCRIPTION OF THE DRAWINGS

The foregoing and other aspects of the presently preferred embodiments of this invention are made more evident in the following Detailed Description of the invention, when read in conjunction with the attached Drawing Figures, wherein.

DETAILED DESCRIPTION

Figure 1B:
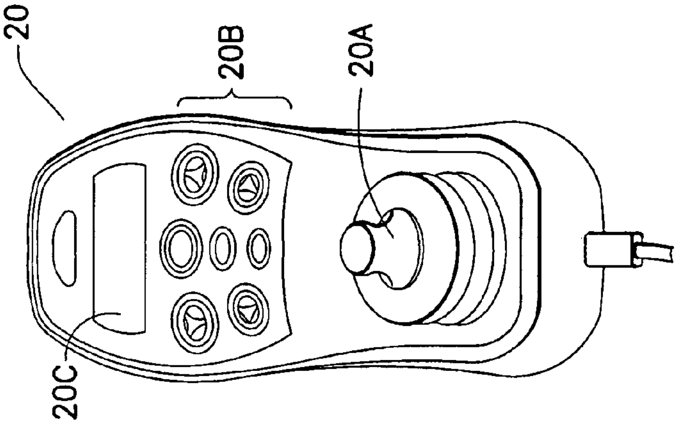
FIG. 1B shows in greater detail a user interface portion of the vehicle of FIG. 1A.
Figure 1A:
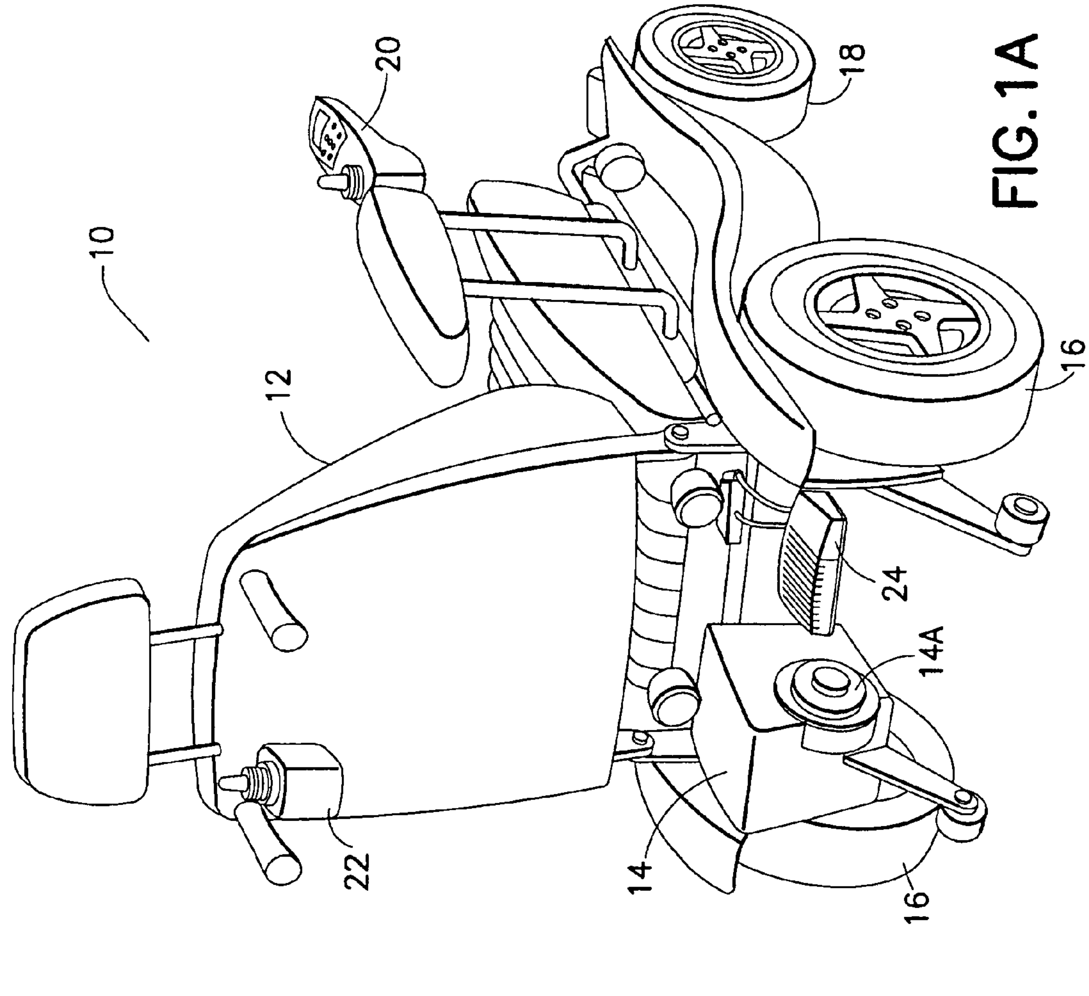
FIG. 1A is an elevational view of an embodiment of a personal mobility vehicle that is suitable for implementing the exemplary embodiments of this invention.

Before describing the exemplary embodiments of this invention in detail reference is first made to FIG. 1A for showing a rear elevational view of an embodiment of a personal mobility vehicle that is suitable for implementing the exemplary embodiments of this invention, as well as to FIG. 1B that shows in greater detail a user interface portion of the vehicle of FIG. 1A. In the embodiment shown in FIGS. 1A and 1B the personal mobility vehicle is embodied as a wheelchair system 10, although this is not a limitation upon the use and practice of the exemplary embodiments of this invention. As employed herein a wheelchair system is considered as a vehicle that may be capable of controlled, self-powered (e.g., battery powered) movement for a sitting person.

The wheelchair system 10 includes a seat portion 12, a power source 14, such as a battery and related power conversion, conditioning and recharging circuitry, and at least two wheels 16 that are driven by the power source 14 via at least one motor 14A. One or more other wheels 18 provide stability and enable steering of the wheelchair system 10. In this regard there is a user interface 20, embodied in this example as a user-actuated hand control system 20 that may include a joystick type controller 20A, a plurality of buttons 20B, and a display 20C, such as an LCD, LED or other suitable type of display system. An attendant control system 22 may also be provided. The user interface 20 operates with a control system of controller 24 to provide functions that include, but need not be limited to, starting and stopping motive power to the drive wheels 16, controlling the direction of rotation and speed of rotation of the drive wheels 16, and controlling a pointing direction of the wheels 18 to provide steering of the wheelchair 10.

Figure 2:
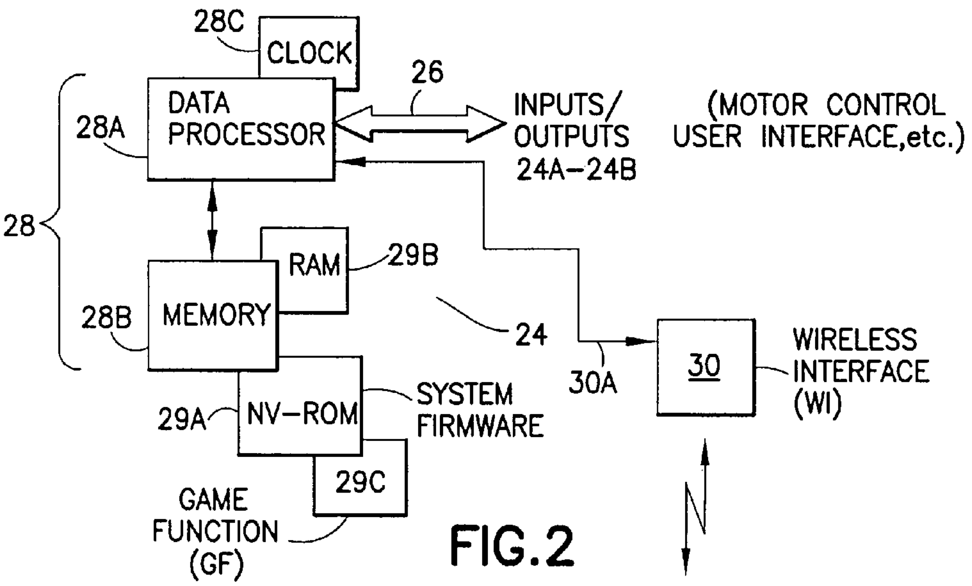
FIG. 2 is a simplified block diagram of a wheelchair system controller in accordance with the exemplary embodiments of this invention.

FIG. 2 shows a simplified block diagram of a portion of the controller 24. The controller 24 can be assumed to include a software system 28 that includes at least one data processor 28A, such as a microprocessor or microcontroller, and a memory 28B that stores programs to control operation of the data processor 28A and, thereby, to control the overall operation of the wheelchair 10. The operating programs may be considered to be firmware, such as computer programs that are permanently stored in, by example, non-volatile read only memory (NV-ROM) 29A, as opposed to possibly volatile random access memory (RAM) 29B that is loaded from a disk or some other type of memory storage medium. However, the exemplary embodiments of this invention are also usable with a system where an operating control program is stored in a mass memory device, such as a disk, and loaded into RAM as needed.

The data processor 28A is coupled via general use input/output hardware 26 to various input/outputs, including general input/outputs, such as input/outputs 24A going to and from the user interface 20 and inputs/outputs 24B providing control to the motor(s) 14. The software system 28 may include a clock function or module 28C for maintaining an accurate time of day and calendar function. Of most interest to the description of this invention is the interactivity of the data processor 28A with the user interface 20 to provide an integrated game playing experience for the user of the wheelchair system 10.

A "game" may be any type of software driven event that is used for entertainment and/or educational purposes. Non-limiting examples include card games (e.g., bridge, poker), board games (e.g., chess, checkers), sporting event type of activities (e.g., hockey, football) and action/fantasy type of activities (e.g., warfare simulations, maze tracing simulations).

Figure 3:
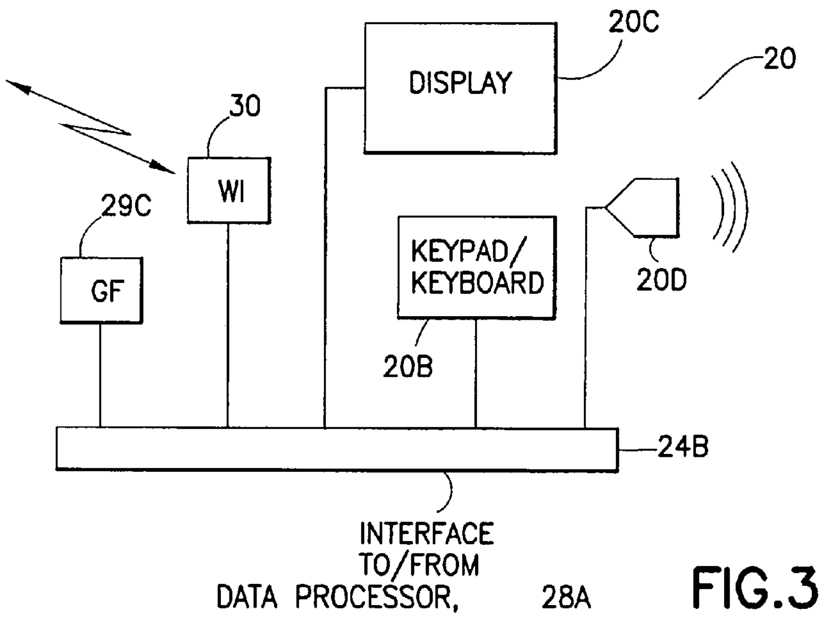
FIG. 3 is a simplified block diagram of the user interface portion shown in FIG. 1B.

FIG. 3 shows a portion of the user interface 20 in greater detail. The user interface 20 includes the keypad/keyboard 20B, the display 20C and possibly an acoustic transducer 20D to provide auditory sounds to the user. In one exemplary embodiment the display 20C may be a touch sensitive display, and in this case the keypad/keyboard 20B may not be needed.

Figure 4:
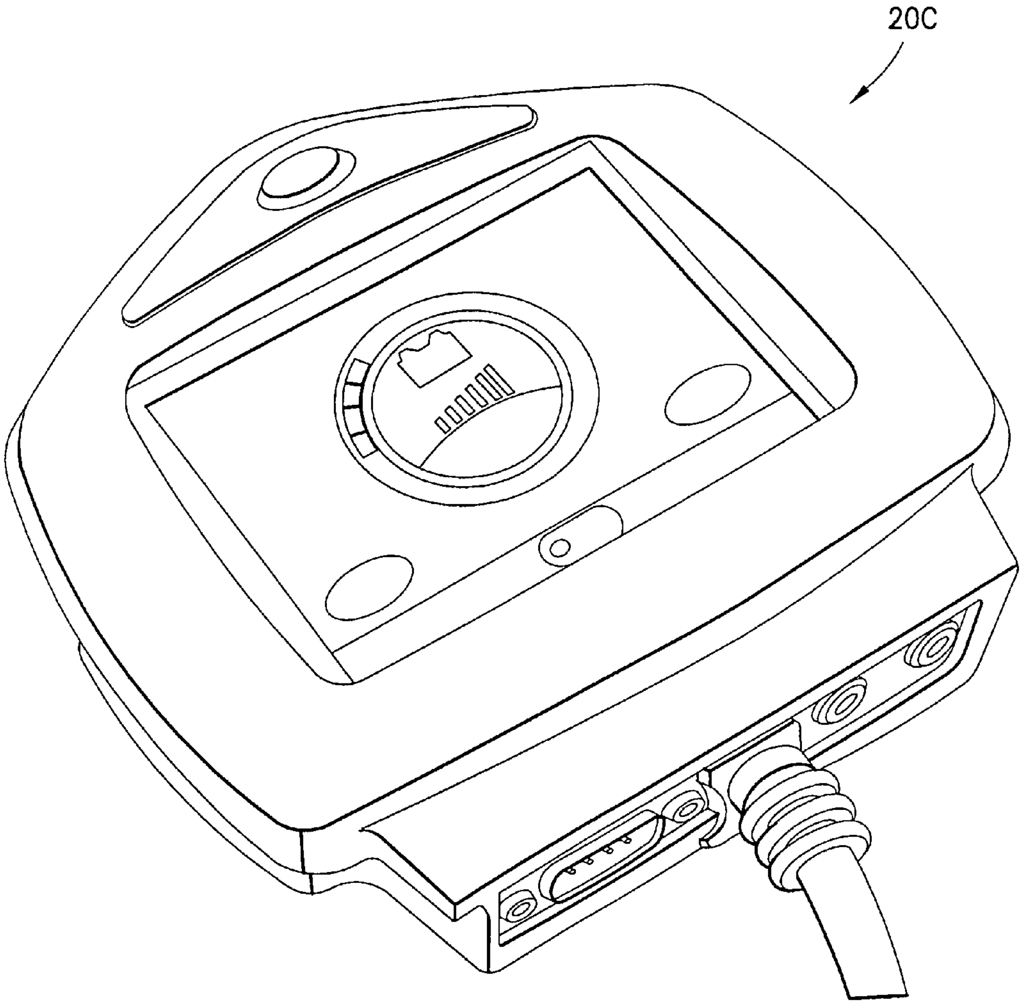
FIG. 4 is an elevational view of one exemplary embodiment of at least a portion of the user interface.

FIG. 4 shows one exemplary embodiment of the display 20C configured as an enhanced display that may have a touch sensitive surface.

The exemplary embodiments of this invention provide a game function (shown as a hardware/software/firmware module GF 29C in FIG. 2) that is integrated into the electrical wheelchair system 10 or some other type of personal mobility vehicle. The GF 29C system is enabled to show information to the user using the display 20C, or by using some other suitable means, and to receive control inputs from the user via any suitable user input modality included in the wheelchair system 10. The user input modality may include one or more of the joystick 20A, buttons 20B, a head array, a voice recognition system, a system that responds to a user's breathe (sip and puff technology) or to a user's eye/eye lid motions, as several non-limiting examples. In general any biometric system, in addition to those already described, that is capable of generating a game input from the user may be used, including skin-mounted or implanted electrodes and related hardware capable of detecting and conditioning neurological signals generated by the user.

Prior to this invention such game playing functionalities were not integrated into the wheelchair system 10.

Also shown in FIG. 2 is an optional wireless interface (WI) 30, such as a Bluetooth™ interface, whereby the user may engage another user in a similarly constructed wheelchair system in game play. Alternatively, the other user may have a conventional portable (non-integrated) game console that includes a compatible wireless interface.

Note that the game function 29C and/or the wireless interface 30 may actually be embodied within the hand control system 20 shown in FIG. 1B, or in the enhanced display 20C shown in the elevational view of FIG. 4. In either case the game function 29C is still considered for the purposes of this invention as being integrated with or in the wheelchair system 10.

In operation, the user may be presented on the display 20C with a menu of wheelchair functions. Assume that one of the functions is related to game play. By selecting the game play function the user can be presented with a list of games that are included with the game function 29C, and that have related game software stored in the memory 28B. By selecting and initiating the game play function the data processor 28A preferably logically switches at least a part of the normal functionality of the wheelchair input device(s) for use by the game function 29C. For example, if the output of the joystick 20A is normally used for wheelchair mobility functions, then the output of the joystick 20A is switched for use instead by the game function 29C. During game play the user may be presented with suitable graphics and like on the display 20C, and may be presented with suitable sound effects via the acoustic transducer 20D. During game play the game function 29C is used in conjunction with the data processor 28A and game software stored in the memory 28B to provide the user with a desired gaming experience, without requiring the use of game software that is stored in and executed by a hardware/software entity separate from the wheelchair system 10, i.e., without requiring a separate game console or game software stored and executed by a separate PC. As was noted above, at least one other game player may be engaged via the game function 29C and the wireless interface 30.

The game play may result in the user obtaining a score, which may be stored in the memory 28B, such as in the non-volatile memory 29A, or in a non-volatile portion of the RAM 29B. Upon achieving a new highest score the user may be automatically congratulated by the game function 29C. In addition, users may be able to compare scores via the wireless interface 30.

Note that the integrated game function 29C may be used for more than entertainment purposes. For example, a user may interact with a particular game when learning to use a new input device. In this case the new input device may be provided along with game software specifically written to aid in training the user to master the associated input device.

In some embodiments the user may be enabled to download and install new/updated game software, such as via the wireless interface 30. Note that upon a user selecting a certain game to play the game software can be downloaded via the wireless or other type of interface to the memory 28B, if the selected game software is not already resident in the memory 28B.

The game function 29C may include a dedicated processor used for game play, or the game software may be executed by the data processor 28A.

As can be appreciated, an exemplary aspect of the embodiments of this invention is a gaming system that is integrated into a personal mobility vehicle, such as the wheelchair system 10, and that enables the user to interact with the gaming system via at least one user input/output modality that forms a part of the personal mobility vehicle. For example, an input modality that is normally employed by the user to control the motion and direction of motion of the personal mobility vehicle is switched for use as a gaming system input device when game play is active.

It should be noted that as used herein the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Note that various modifications and adaptations of the foregoing exemplary embodiments of this invention may become apparent to those skilled in the relevant arts in view of the foregoing description, when read in conjunction with the accompanying drawings and the appended claims. As but some examples, the use of the exemplary embodiments of this invention is not limited to wheelchairs, but could encompass other types of mobility systems.

Further, the user interface 20 may be implemented at least in part using voice recognition technology to enter user information, and the acoustic transducer 20D may present synthesized speech to the user, as opposed to the use of a visual display. That is, the technical specifics of the user input/output may vary widely depending on the physical capabilities of the user, and any suitable type of user input/output biometric means may be employed to implement the exemplary embodiments of this invention.

However, all such and similar modifications of the teachings of this invention will still fall within the scope of the embodiments of this invention.

Furthermore, some of the features of the preferred embodiments of this invention may be used to advantage without the corresponding use of other features. As such, the foregoing description should be considered as merely illustrative of the principles, teachings and embodiments of this invention, and not in limitation thereof.

What is claimed is:

1. A method to operate a personal mobility vehicle, comprising:

receiving an input from a user, the input selecting a game function via a user interface of the personal mobility vehicle, the game function being integrated into the personal mobility vehicle; and the user playing a game via the user interface, where the user interface is used by the user in one first mode of operation to control at least one mobility function of the personal mobility vehicle and at least a portion of the user interface is switched to another second mode of operation in response to the input from the user for use as a gaming program input device for the game function and not to control the at least one mobility function.

2. The method of claim 1, where the first mode of operation comprises a normal mode of operation that controls the at least one mobility function, and where at least a portion of the user interface is logically switched from the normal mode of operation to the second mode of operation for use as the gaming program input device.

3. The method of claim 1, where the personal mobility vehicle is a wheelchair system.

4. The method of claim 1, where the user interface comprises at least a visual display, and where the user plays the game by providing a game input via at least one of a touch sensitive surface, a joystick, a button, a head array, a voice recognition system, a system that responds to a user's breathe, a system that responds to a user's eye/eye lid motions, or any other biometric system that is capable of generating a game input from the user.

5. The method of claim 1, where playing the game comprises communication with another game player via a wireless interface.

6. A personal mobility vehicle, comprising:

a user interface that comprises a user input and a display for displaying information to the user; and a control unit that comprises a data processor and a memory, said data processor responsive to the user entering information into the personal mobility vehicle, where the information comprises a user selection of a game function integrated into the personal mobility vehicle, to enable the user to play a game via the user interface, where the user interface is used by the user in one first mode of operation to control at least one mobility function of the personal mobility vehicle and at least a portion of the user interface is switched to another second mode of operation in response to the information entered by the user for use as a gaming program input device for the game function and not to control the at least one mobility function.

7. The personal mobility vehicle of claim 6, where the first mode of operation comprises a normal mode of operation that controls the at least one mobility function, and where at least a portion of the user interface is logically switched from the normal mode of operation to the second mode of operation for use as the gaming program input device.

8. The personal mobility vehicle of claim 6, where the personal mobility vehicle is a wheelchair system.

9. The personal mobility vehicle of claim 6, where the user input comprises at least one of a touch sensitive surface, a joystick, a button, a head array, a voice recognition system, a system that responds to a user's breathe, a system that responds to a user's eye/eye lid motions, or any other biometric system that is capable of generating a game input from the user.

10. The personal mobility vehicle of claim 6, further comprising a wireless interface configured for communication with another game player during game play.

11. A non-transitory computer-readable memory that tangibly stores a computer program for execution by a data processor to implement a user interface of a wheelchair system by operations that comprise:

enabling a user to select a game function via a user interface of the wheelchair system, the game function being integrated into the wheelchair system; and enabling the user to play a game via the user interface; where the user interface is used by the user in one first mode of operation to control at least one mobility function of the wheelchair system and at least a portion of the user interface is switched to another second mode of operation in response to the user selecting the game function for use as a gaming program input device for the game function and not to control the at least one mobility function.

12. The memory of claim 11, where the first mode of operation comprises a normal mode of operation that controls the at least one mobility function, and where at least a portion of the user interface is logically switched from the normal mode of operation to the second mode of operation for use as the gaming program input device.

13. The memory of claim 11, where the user interface comprises at least a visual display, and where the user plays the game by providing a game input via at least one of a touch sensitive surface, a joystick, a button, a head array, a voice recognition system, a system that responds to a user's breathe, a system that responds to a user's eye/eye lid motions, or any other biometric system that is capable of generating a game input from the user.

14. The memory of claim 11, where playing the game comprises communication with another game player via a wireless interface.

15. A wheelchair system, comprising:

a user seat portion;

a power source;

wheels that are drivable by the power source via at least one motor;

a controller; and a user interface comprising at least one input modality and at least one output modality, the user interface being connected with the controller to provide mobility functions of the wheelchair system comprising at least starting and stopping motive power to the wheels;

where said controller comprises at least one data processor and at least one non-transitory memory that stores programs to control operation of the data processor, at least one stored program comprising a gaming program that is integrated into the wheelchair system and that enables the user to interact with the gaming program via at least one of the user input modality and user output modality that form a part of the user interface, and where an input modality that is normally employed by the user to control at least one mobility function of the wheelchair system is switched for use as a gaming program input device when game play is active and not to control the at least one mobility function of the wheelchair system.

16. The wheelchair system of claim 15, further comprising a wireless interface configured to enable the user to engage at least one other user in game play when the game play is active.

17. The wheelchair system of claim 16, where the wireless interface is further configured to enable the user to exchange at least game-related information with the at least one other user.

18. The wheelchair system of claim 17, where the game-related information is comprised of a score.

19. The wheelchair system of claim 16, where the wireless interface is further configured to at least one of download a new game program for storage in the memory and update a game program already stored in the memory.

20. The wheelchair system of claim 15, where the input modality that is switched for use as a gaming program input device is comprised of a joystick.

* * * * *